US012583501B2

(12) United States Patent
Hong et al.

(10) Patent No.: US 12,583,501 B2
(45) Date of Patent: Mar. 24, 2026

(54) STOWABLE ELECTRIC COLUMN

(71) Applicant: NAMYANG NEXMO Co., Ltd,
Ansan-si (KR)

(72) Inventors: Jin Yong Hong, Ansan-si (KR); Kwan Taek Jung, Ansan-si (KR)

(73) Assignee: NAMYANG NEXMO CO., LTD,
Ansan-si (KR)

( * ) Notice: Subject to any disclaimer, the term of this patent is extended or adjusted under 35 U.S.C. 154(b) by 0 days.

(21) Appl. No.: 19/080,954

(22) Filed: Mar. 17, 2025

(65) Prior Publication Data

US 2025/0206366 A1 Jun. 26, 2025

Related U.S. Application Data

(63) Continuation of application No. PCT/KR2023/013616, filed on Sep. 12, 2023.

(30) Foreign Application Priority Data

Sep. 26, 2022 (KR) ........................ 10-2022-0121684

(51) Int. Cl.
*B62D 1/181* (2006.01)
*B62D 1/183* (2006.01)
*B62D 1/187* (2006.01)

(52) U.S. Cl.
CPC ............. *B62D 1/183* (2013.01); *B62D 1/181* (2013.01)

(58) Field of Classification Search
CPC .......... B60Y 2400/70; B60Y 2400/702; B60Y 2400/83; B60Y 2410/102;

(Continued)

(56) References Cited

U.S. PATENT DOCUMENTS 3,747,427 A * 7/1973 Milton ................... B62D 1/195
74/492
RE34,359 E * 8/1993 Matsumoto ............ B62D 1/181
74/495

(Continued)

FOREIGN PATENT DOCUMENTS

CN 108367771 A * 8/2018 ............. B62D 1/183
DE 102020206879 A1 * 12/2021 ............... B62D 1/16

(Continued)

OTHER PUBLICATIONS

Description Translation for KR 20220001565 from Espacenet (Year: 2022).*

(Continued)

*Primary Examiner* — Jason D Shanske
*Assistant Examiner* — Daniel M. Keck
(74) *Attorney, Agent, or Firm* — Paratus Law Group, PLLC

(57) ABSTRACT

A stowable electric column includes: a first column portion; a second column portion which is slidably and coaxially disposed inside the first column portion and is movable in the longitudinal direction through one end of the first column portion; a third column portion which is coaxially disposed to be fastened to the inside of the second column portion and is movable in the longitudinal direction through one end of the second column portion; and a teledrive unit which moves the second column portion and the third column portion in the longitudinal direction, so that the length of the column is configured to be as variable as possible, and thus, a maximum space in a cabin for the convenience and activities of a driver during autonomous driving of a vehicle may be secured.

9 Claims, 8 Drawing Sheets

(58) Field of Classification Search
CPC .... B60Y 2410/1022; B62D 1/16; B62D 1/18;
B62D 1/181; B62D 1/183; B62D 1/185;
B62D 1/187; B62D 1/19; B62D 3/12;
B62D 5/0409; B62D 1/181183; F16C
3/03; F16C 2326/24
USPC .................................................... 74/492, 493
See application file for complete search history.

(56) References Cited

U.S. PATENT DOCUMENTS

| | | | | |
|---|---|---|---|---|
| 7,938,442 | B2 * | 5/2011 | Matsuo | B60R 21/2032 |
| | | | | 280/731 |
| 10,577,010 | B2 * | 3/2020 | Derocher | B62D 1/183 |
| 2019/0225254 | A1 * | 7/2019 | Ishimura | B62D 1/181 |
| 2019/0322307 | A1 * | 10/2019 | Kwon | B62D 1/181 |
| 2020/0207401 | A1 | 7/2020 | Martinez et al. | |
| 2024/0051593 | A1 * | 2/2024 | Kim | B62D 1/192 |

FOREIGN PATENT DOCUMENTS

| | | | | | |
|---|---|---|---|---|---|
| DE | 102022114095 | B3 * | 6/2023 | | B62D 1/181 |
| DE | 102022211816 | B4 * | 12/2024 | | B62D 5/0454 |
| EP | 0734935 | A2 * | 10/1996 | | B62D 1/16 |
| JP | 2021-045999 | A | 3/2021 | | |
| KR | 10-2007-0109146 | A | 11/2007 | | |
| KR | 10-2019-0123457 | A | 11/2019 | | |
| KR | 20200092623 | A * | 8/2020 | | B62D 1/187 |
| KR | 10-2022-0001565 | A | 1/2022 | | |
| KR | 20240039950 | A * | 3/2024 | | B62D 1/183 |
| KR | 20240063068 | A * | 5/2024 | | B62D 1/181 |
| KR | 102844892 | B1 * | 8/2025 | | B62D 3/06 |
| WO | WO-2021224199 | A1 * | 11/2021 | | B62D 1/185 |

OTHER PUBLICATIONS

Description Translation for WO 2021224199 from Espacenet (Year: 2021).*
International Search Report for PCT/KR2023/013616 mailed Dec. 13, 2023 from Korean Intellectual Property Office.

* cited by examiner

STOWABLE ELECTRIC COLUMN

CROSS-REFERENCE TO PRIOR APPLICATIONS

This application is a Continuation Application of PCT International Application No. PCT/KR2023/013616 (filed on Sep. 12, 2023), which claims priority to Korean Patent Application No. 10-2022-0121684 (filed on Sep. 26, 2022), which are all hereby incorporated by reference in their entirety.

BACKGROUND

The present disclosure relates to a stowable electric column, and more particularly, to a stowable electric column configured to enable the length of the column to be as variable as possible, thereby securing a maximum space in a cabin for the convenience and activities of a driver during autonomous driving of a vehicle.

In general, a vehicle steering system is a system that changes the direction of the front wheels of the vehicle to the right or left, thereby changing the vehicle's driving direction to the right or left.

The steering system includes a steering wheel, which is a component gripped by a driver with hands. When the driver rotates the steering wheel to the right or left, the steering shaft, which is coupled to an upper end portion of the steering wheel, rotates. The rotational force of the steering shaft is transmitted to the steering gear, causing the rack bar of the steering gear to move right or left. As a result, the right tie rod and the left tie rod move right or left, thereby changing the direction of the front wheels of the vehicle to the right or left.

Meanwhile, the steering system includes a telescoping and tilting function. The telescoping and tilting function allows the driver to adjust the extent to which the steering wheel protrudes into the vehicle interior and the tilt angle thereof based on the driver's height or body shape, thereby enabling smooth steering operation.

In addition, the telescoping and tilting function is initially operated manually, requiring the driver to manipulate an adjustment lever to move the steering wheel in the axial direction or rotate the steering wheel around a hinge axis disposed perpendicular to the axial direction. However, an automatic operation method using a motor has been developed.

Recently, with the rapid advancement of autonomous vehicle development, securing space for the driver in autonomous driving mode has emerged as a key issue.

Korean Patent No. 10-2368822 (published on Mar. 3, 2022) (hereinafter referred to as a "conventional technology") discloses a "Rail Storeable Electric Column," a technology that increases the telescopic range of an electric column.

The conventional technology includes a rail base fixed to the vehicle body, a column assembly coupled to one side of the rail base to control the telescopic range of the steering wheel through sliding movement, ball-bearing rails provided at both ends of the rail base, and driving ball bearings disposed on both sides of the column assembly, which are supported by and move along the ball-bearing rails to control the telescopic of the column, and a driving device that provides a driving force to move the column assembly along the rail base in order to control the telescoping in-and-out movement of the column according to the driver's operation.

However, in the conventional technology, the length of the column assembly is not variable, and the telescopic range of the column assembly is adjusted by moving the column assembly relative to the rail base. As a result, the installation of the rail base, ball-bearing rails, and driving ball bearings makes it difficult to secure space within the vehicle interior. In addition, due to the load of the column assembly, a large amount of operating force is required to adjust the telescopic range of the column assembly.

SUMMARY

An object of the present disclosure is to provide a stowable electric column configured to enable the length of the column to be as variable as possible, thereby securing a maximum space in a cabin for the convenience and activities of a driver during autonomous driving of a vehicle.

Another object of the present disclosure is to provide a stowable electric column that may reduce the operating force during the length adjustment of the column.

Technical objects of the present disclosure are not limited to the aforementioned objects, and the other objects not described above may be evidently understood from the following description by those skilled in the art.

In order to achieve the objects, a stowable electric column according to the present disclosure includes a first column portion, a second column portion, a third column portion, and a teledrive unit. The second column portion is slidably and coaxially disposed inside the first column portion. The second column portion may move in the longitudinal direction through one end of the first column portion. The third column portion is coaxially disposed to be fastened to the inside of the second column portion. The third column portion may move in the longitudinal direction through one end of the second column portion. The teledrive unit moves the second column portion and the third column portion in the longitudinal direction.

The teledrive unit may include a first tele screw bar and a second tele screw bar. The first tele screw bar may move in the longitudinal direction through a rotational motion, thereby moving the second column portion and the third column portion in the longitudinal direction. The second tele screw bar may be mounted in the first column portion. The second tele screw bar may have threads formed on an outer circumferential surface of the second tele screw bar, which engage with threads formed on an inner circumferential surface of the first tele screw bar, thereby being inserted into or withdrawn from the inside of the first tele screw bar as the first tele screw bar moves in the longitudinal direction through the rotational motion.

The teledrive unit may further include a tele bracket, a tele nut, a tele gearbox, and a tele motor. The tele bracket may be movably mounted on the second column portion in the longitudinal direction. The tele bracket may be coupled to the third column portion. The tele nut may be mounted in the tele bracket. The first tele screw bar may pass through the tele nut. The tele nut may move along the length of the first tele screw bar together with the tele bracket through the rotational motion of the first tele screw bar. The tele gearbox may be mounted on the second column portion. The tele gearbox may have a plurality of gears inside. The plurality of gears may rotate the first tele screw bar through a rotational motion. The tele motor may rotate the plurality of gears.

A tele guide hole may be formed in the second column portion to extend in the longitudinal direction. The tele bracket may move in the longitudinal direction of the second column portion along the tele guide hole.

The plurality of gears may include a worm gear and a worm wheel gear. The worm gear may be rotatably disposed inside the tele gearbox. The worm wheel gear may be rotatably disposed inside the tele gearbox. The worm wheel gear may engage with the worm gear. One end portion of the first tele screw bar may be disposed inside the tele gearbox so that the worm wheel gear may be engaged. One end portion of the second tele screw bar may pass through the tele gearbox and the worm wheel gear, and be inserted into the end portion of the first tele screw bar.

The stowable electric column according to the present disclosure may further include a support roller and a support guide bar. The support roller may be rotatably mounted on the second column portion. A seating groove may be formed in an outer circumferential surface of the support roller. The support guide bar may be mounted in the first column portion to extend in the longitudinal direction. The support guide bar may be seated in the seating groove, thereby supporting the support roller during the longitudinal movement of the second column portion and guiding the rotation and longitudinal movement of the support roller.

The seating groove may be V-shaped.

The support roller may be provided as a plurality of support rollers. The plurality of support rollers may include at least one first support roller and at least one second support roller. One side of the support guide bar may be inserted into the seating groove of at least one first support roller. The other side of the support guide bar may be inserted into the seating groove of at least one second support roller.

The stowable electric column according to the present disclosure may further include a roller mounting bracket. The roller mounting bracket may be coupled to the second column portion and move in the longitudinal direction together with the second column portion during the longitudinal movement of the second column portion. The support roller may be rotatably mounted on the roller mounting bracket.

The stowable electric column according to the present disclosure may further include an operating force adjustment bolt. The operating force adjustment bolt may be installed in the roller mounting bracket. The operating force adjustment bolt may contact the support guide bar and adjust the longitudinal operating force of the second column portion.

The details of other embodiments are included in the detailed description and drawings.

The stowable electric column according to the present disclosure includes the first column portion, the second column portion which is slidably and coaxially disposed inside the first column portion and is movable in the longitudinal direction through one end of the first column portion, the third column portion which is coaxially disposed to be fastened to the inside of the second column portion and is movable in the longitudinal direction through one end of the second column portion, and the teledrive unit which moves the second column portion and the third column portion in the longitudinal direction, so that the length of the column is configured to be as variable as possible, and thus, a maximum space in a cabin for the convenience and activities of a driver during autonomous driving of a vehicle may be secured.

Furthermore, the stowable electric column according to the present disclosure includes the first tele screw bar which moves in the longitudinal direction through a rotational motion and moves the second column portion and the third column portion in the longitudinal direction, and the second tele screw bar mounted in the first column portion and configured to have threads formed on the outer circumferential surface thereof, which engage with threads formed on the inner circumferential surface of the first tele screw bar, thereby being inserted into or withdrawn from the inside of the first tele screw bar as the first tele screw bar moves in the longitudinal direction through the rotational motion, so that the length of the column is configured to be as variable as possible, and thus, a maximum space in a cabin for the convenience and activities of a driver during autonomous driving of a vehicle may be secured.

Furthermore, the stowable electric column according to the present disclosure can stably support and smoothly move the second column portion in the longitudinal direction through the support roller and support guide bar during the length adjustment of the column, thereby reducing the operating force during the length adjustment of the column.

Effects of the present disclosure are not limited to the aforementioned effects, and the other effects not described above may be evidently understood by those skilled in the art from the claims.

DESCRIPTION OF REFERENCE NUMERALS

Figure 1:
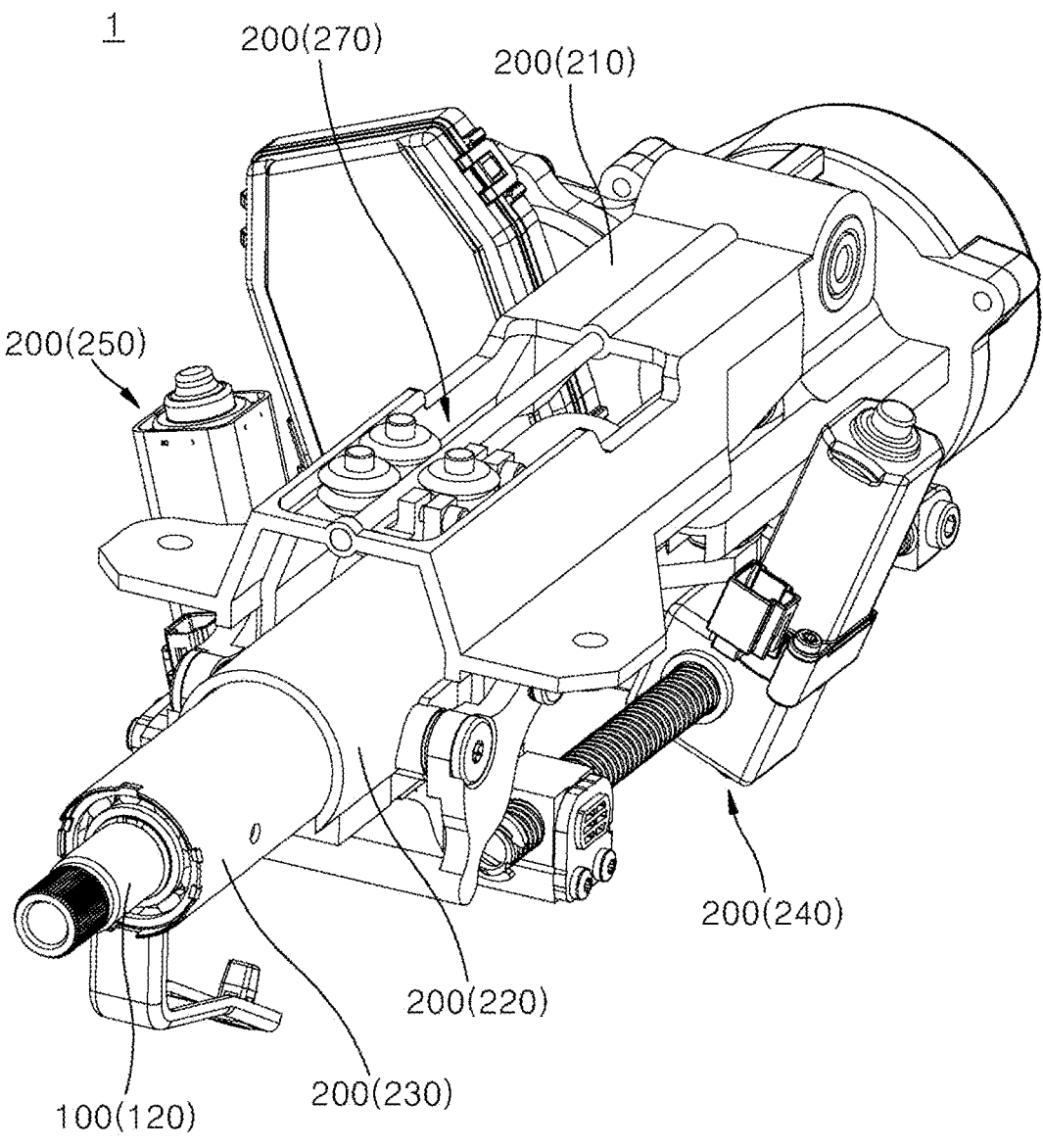
FIG. 1 is a perspective view showing a vehicle steering system including a stowable electric column according to an embodiment of the present disclosure, which shows a fully tele-out state, where the stowable electric column according to the embodiment of the present disclosure is adjusted to the fully extended length.

200: stowable electric column 210: first column portion
220: second column portion 225: tele guide hole
230: third column portion 240: teledrive unit
241: first tele screw bar 242: second tele screw bar
243: tele bracket 244: tele nut
245: tele gearbox 246: tele motor
247: worm gear 248: worm wheel gear
271: first support roller 271A: seating groove
272: second support roller 273: support guide bar
275: roller mounting bracket 276: operating force adjustment bolt

DETAILED DESCRIPTION

Hereinafter, a stowable electric column according to an embodiment of the present disclosure is described with reference to the drawings.

Figure 2:
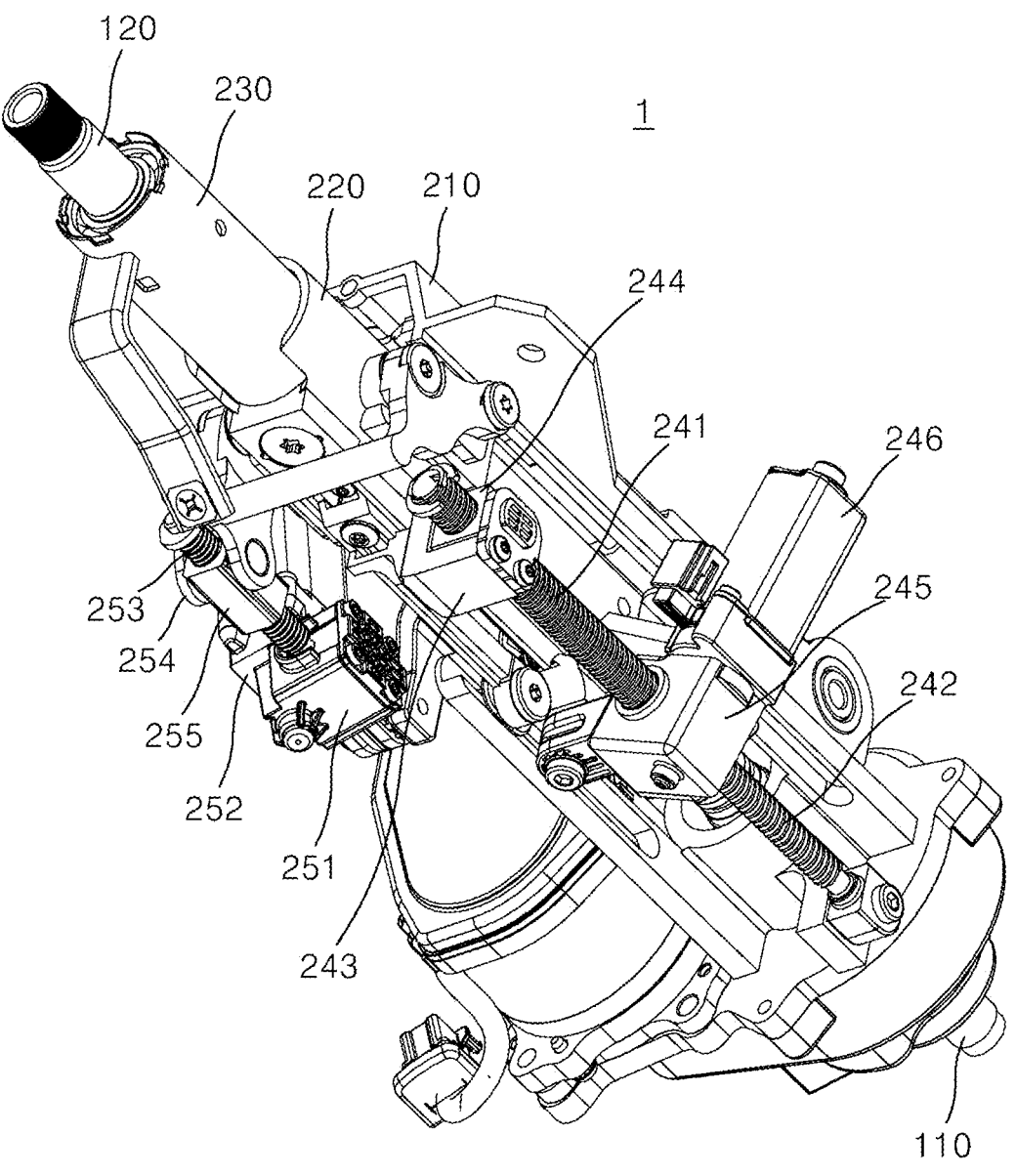
FIG. 2 is a bottom perspective view of FIG. 1.
Figure 3:
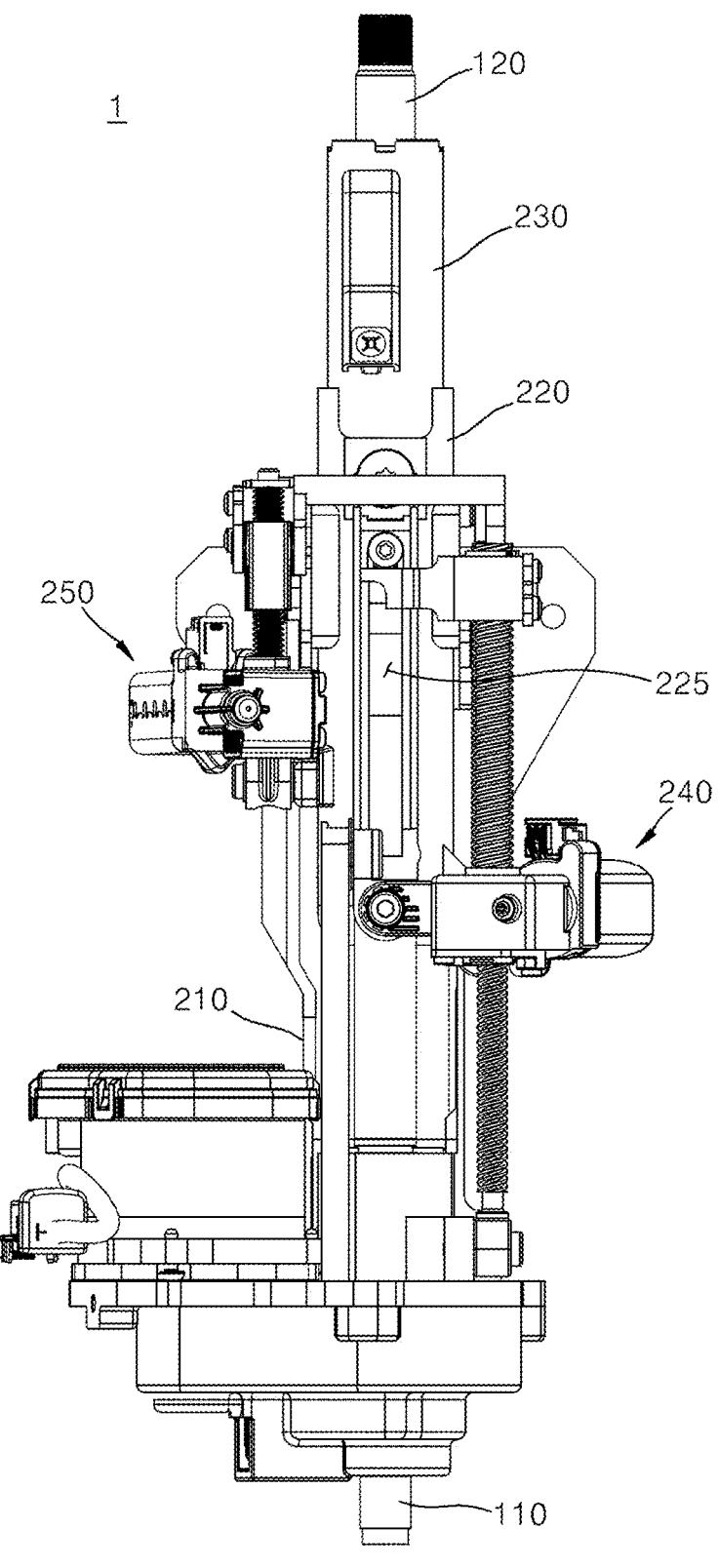
FIG. 3 is a bottom view of FIG. 1.
Figure 4:
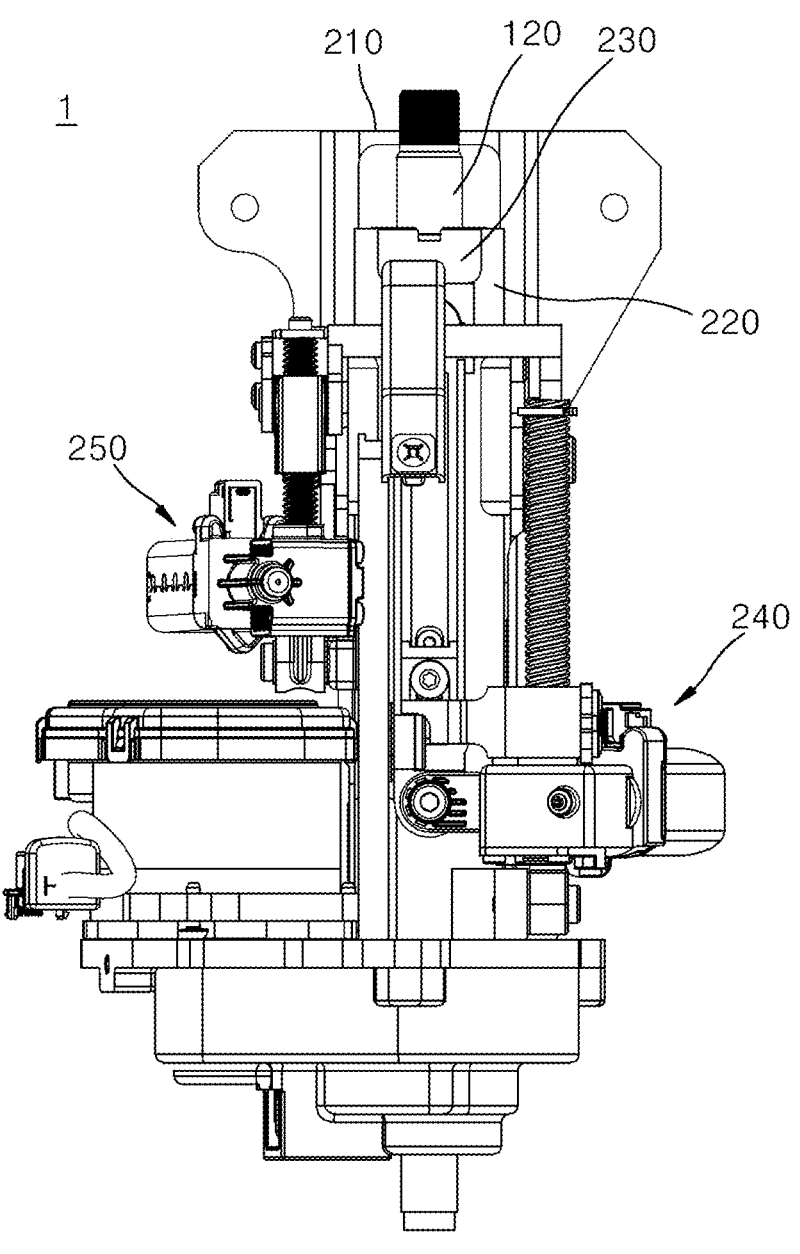
FIG. 4 is a view showing a fully tele-in state, where the stowable electric column in the vehicle steering system shown in FIG. 3 is adjusted to the fully retracted length.

FIG. 1 is a perspective view showing a vehicle steering system including a stowable electric column according to an embodiment of the present disclosure, which shows a fully tele-out state, where the stowable electric column according to the embodiment of the present disclosure is adjusted to the fully extended length. FIG. 2 is a bottom perspective view of FIG. 1. FIG. 3 is a bottom view of FIG. 1. FIG. 4 is a view showing fully tele-in state, where the stowable electric column in the vehicle steering system shown in FIG. 3 is adjusted to the fully retracted length.

Here, tele out may refer to an increase in the overall axial length of a stowable electric column 200, and tele in may refer to a decrease in the overall axial length of the stowable electric column 200. In the following description, tele may refer to an axial movement of the stowable electric column 200.

Referring to FIGS. 1 to 4, a vehicle steering system 1 according to the embodiment of the present disclosure may include a steering shaft 100 and the stowable electric column 200. The steering shaft 100 and the stowable electric column 200 may have a variable axial length.

A steering wheel (not shown), which is a component gripped by a driver with hands to steer the vehicle's driving direction, may be mounted at one end portion of the steering shaft 100. That is, the driver may grip the steering wheel with hands and turn the steering wheel left to steer the vehicle's driving direction to the left, and grip the steering wheel with hands and turn the steering wheel right to steer the vehicle's driving direction to the right.

The steering shaft 100 may axially pass through the stowable electric column 200. Both ends of the steering shaft 100 may be disposed to protrude through both ends of the stowable electric column 200. That is, one end of the steering shaft 100 may protrude through one end of the stowable electric column 200, and the other end of the steering shaft 100 may protrude through the other end of the stowable electric column 200.

The steering shaft 100 may be locked to prevent axial movement relative to the stowable electric column 200. The steering shaft 100 may be rotatably coupled to the stowable electric column 200 in the circumferential direction via ball bearings. In the event of a vehicle accident, an external force applied to the steering shaft 100 may cause the steering shaft 100 to unlock from the stowable electric column 200 and move axially, thereby reducing injury to the driver.

The steering shaft 100 may include a first shaft 110 and a second shaft 120. One end portion of the first shaft 110 may be disposed to be inserted into the inside of one end portion of the second shaft 120 through one end of the second shaft 120. As the end portion of the first shaft 110 is inserted into or withdrawn from the inside of the end portion of the second shaft 120, the axial length of the steering shaft 100 may vary. Serrations that engage with each other are formed on an outer circumferential surface of the end portion of the first shaft 110 and an inner circumferential surface of the end portion of the second shaft 120, allowing the first shaft 110 and the second shaft 120 to move axially without rotating in the circumferential direction, varying thereby the axial length.

The first shaft 110 may be rotatably coupled in the circumferential direction to the inner circumferential surface of a second column portion 220, which will be described later, via a first ball bearing, and the second shaft 120 may be rotatably coupled in the circumferential direction to the inner circumferential surface of a third column portion 230, which will be described later, via a second ball bearing.

When the axial length of the stowable electric column 200 varies, the steering shaft 100 may move axially together with the stowable electric column 200, allowing the axial length to vary. That is, when the second column portion 220 is withdrawn from or inserted into the first column portion 210, the first shaft 110 may move axially together with the second column portion 220. In addition, when the third column portion 230 is withdrawn from or inserted into the second column portion 220, the second shaft 120 may move axially together with the third column portion 230.

The steering shaft 100 may pass through the stowable electric column 200. At least a portion of the stowable electric column 200 may be formed to have a cylindrical shape through which the steering shaft 100 passes. The stowable electric column 200 may independently include a configuration capable of performing tele-out and tele-in functions. Specifically, the stowable electric column 200 may include the first column portion 210, the second column portion 220, the third column portion 230, and a teledrive unit 240.

The first column portion 210 may be formed to have a shape through which the steering shaft 100 passes. The first column portion 210 may be formed to surround the outer circumference of the steering shaft 100 and may have a multi-folded plate shape with one side open. The second column portion 220 and the third column portion 230 may be formed to have a cylindrical shape through which the steering shaft 100 passes. However, the shapes of the first column portion 210, the second column portion 220, and the third column portion 230 may be variously modified as long as they may rotatably support the steering shaft 100.

The first column portion 210 may form one end portion of the stowable electric column 200, the second column portion 220 may form a central portion of the stowable electric column 200, and the third column portion 230 may form the other end portion of the stowable electric column 200.

The second column portion 220 may be coupled to the first column portion 210 so as to move axially (longitudinally) without rotating in the circumferential direction, and the third column portion 230 may be coupled to the second column portion 220 so as to move axially (longitudinally) without rotating in the circumferential direction. The stowable electric column 200 may have a variable axial length as the second column portion 220 moves axially to be inserted into or withdrawn from the inside of the first column portion 210, and the third column portion 230 moves axially to be inserted into or withdrawn from the inside of the second column portion 220. Through this, the length may be adjusted to suit the driver's physical characteristics. In addition, in the event of a vehicle accident, an external force applied to the stowable electric column 200 may cause the second column portion 220 to be inserted into the inside of the first column portion 210 and the third column portion 230 to be inserted into the inside of the second column portion 220, thereby preventing injury to the driver.

The first column portion 210 may be mounted on the vehicle body so as not to move in the longitudinal direction. The second column portion 220 may be slidably and coaxially disposed inside the first column portion 210. A portion of the second column portion 220 may be disposed inside the first column portion 210. The second column portion 220 may move in the longitudinal direction through one end of the first column portion 210. The third column portion 230 may be coaxially disposed inside the second column portion 220 to be fastened. A portion of the third column portion 230 may be disposed inside the second column portion 220. The third column portion 230 may move in the longitudinal direction through one end of the second column portion 220.

The teledrive unit 240 may move the second column portion 220 and the third column portion 230 in the longitudinal direction using electric power thereof. Through this, the driver may operate the teledrive unit 240 to vary the length of the stowable electric column 200, thereby adjusting the telescopic range of the stowable electric column 200 to suit the driver's physical characteristics.

The axial length of the stowable electric column 200 may be adjusted to the fully extended length by the driving force of the teledrive unit 240, as referenced in FIGS. 1 to 3, and adjusted to the fully retracted length, as referenced in FIG. 4.

The teledrive unit 240 will be described in detail later, and a tilt drive unit 250 will be described first.

The stowable electric column 200 may further include the tilt drive unit 250. The tilt drive unit 250 may adjust the tilt angle (amount of tilt) of the stowable electric column 200.

The tilt drive unit 250 may include a tilt gearbox 251, a tilt motor 252, a tilt screw bar 253, a tilt bracket 254, and a tilt nut 255.

The tilt gearbox 251 may be fixedly mounted on the second column portion 220. The tilt motor 252 may be fixedly mounted on the tilt gearbox 251. The tilt screw bar 253 may be rotatably mounted in the circumferential direction in the tilt gearbox 251. The tilt bracket 254 may be fixedly mounted on the first column portion 210. The tilt nut 255 may be mounted in the tilt bracket 254. The tilt screw bar 253 may pass through the tilt nut 255.

The rotation axis of the tilt motor 252 may be disposed perpendicular to the tilt screw bar 253. The tilt nut 255 may have threads formed on an inner circumferential surface thereof, and the threads formed on the inner circumferential surface of the tilt nut 255 may engage with the threads formed on an outer circumferential surface of the tilt screw bar 253.

A worm gear and a worm wheel gear may be rotatably disposed inside the tilt gearbox 251. Here, the worm gear may be coupled to the rotation axis of the tilt motor 252, and the worm wheel gear may be engaged with the worm gear. In addition, the tilt screw bar 253 may be coupled to the center of the worm wheel gear.

Therefore, when the tilt motor 252 is driven, the tilt screw bar 253 may rotate in the circumferential direction, and accordingly, the tilt nut 255 may move axially, which corresponds to the longitudinal direction of the tilt screw bar 253, enabling the stowable electric column 200 to perform the tilt function. To enable the tilt function, the stowable electric column 200 may be rotatably coupled to the vehicle body through a mounting bracket.

Figure 5:
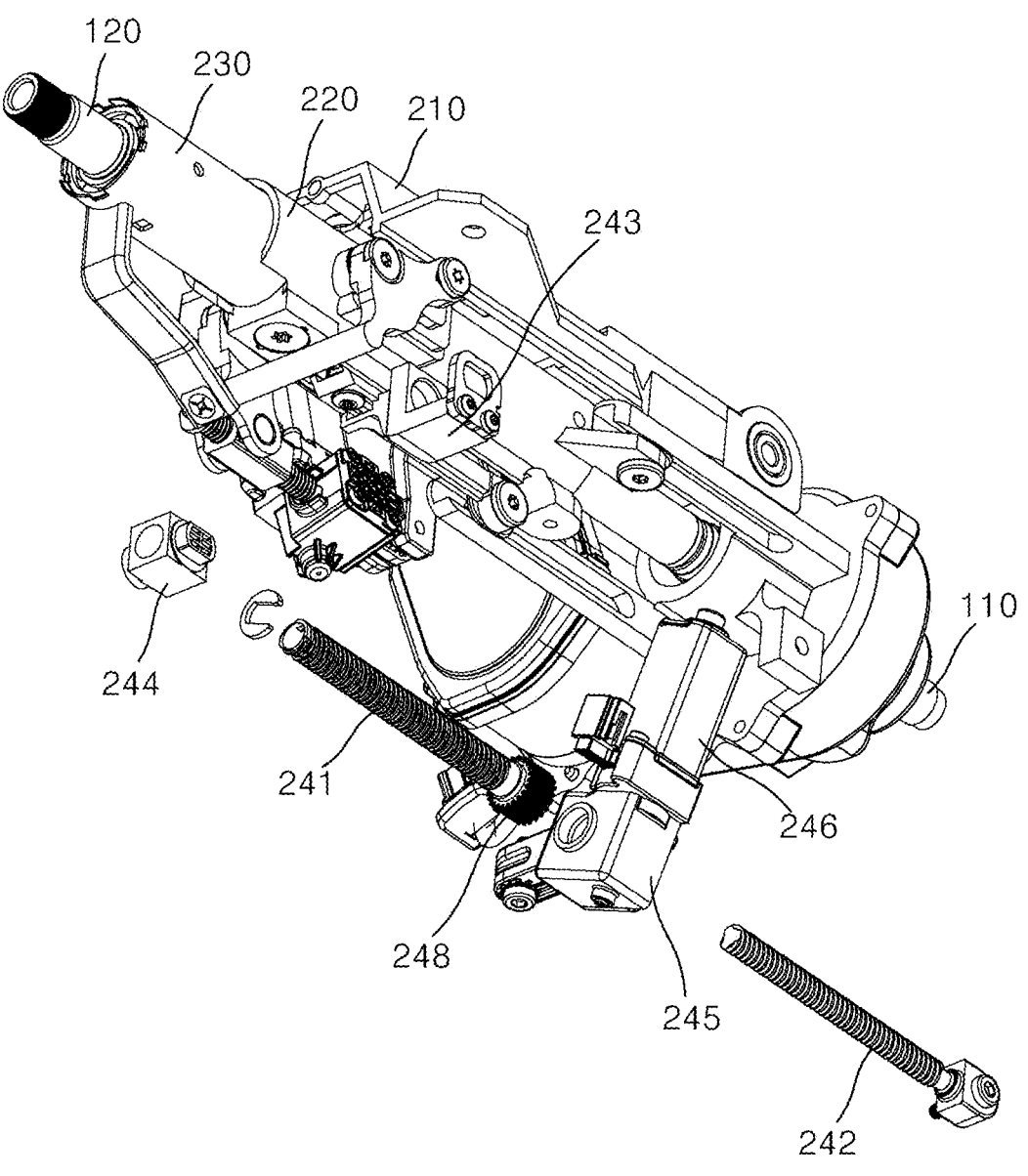
FIG. 5 is an exploded perspective view of a teledrive unit in FIG. 2.
Figure 6:
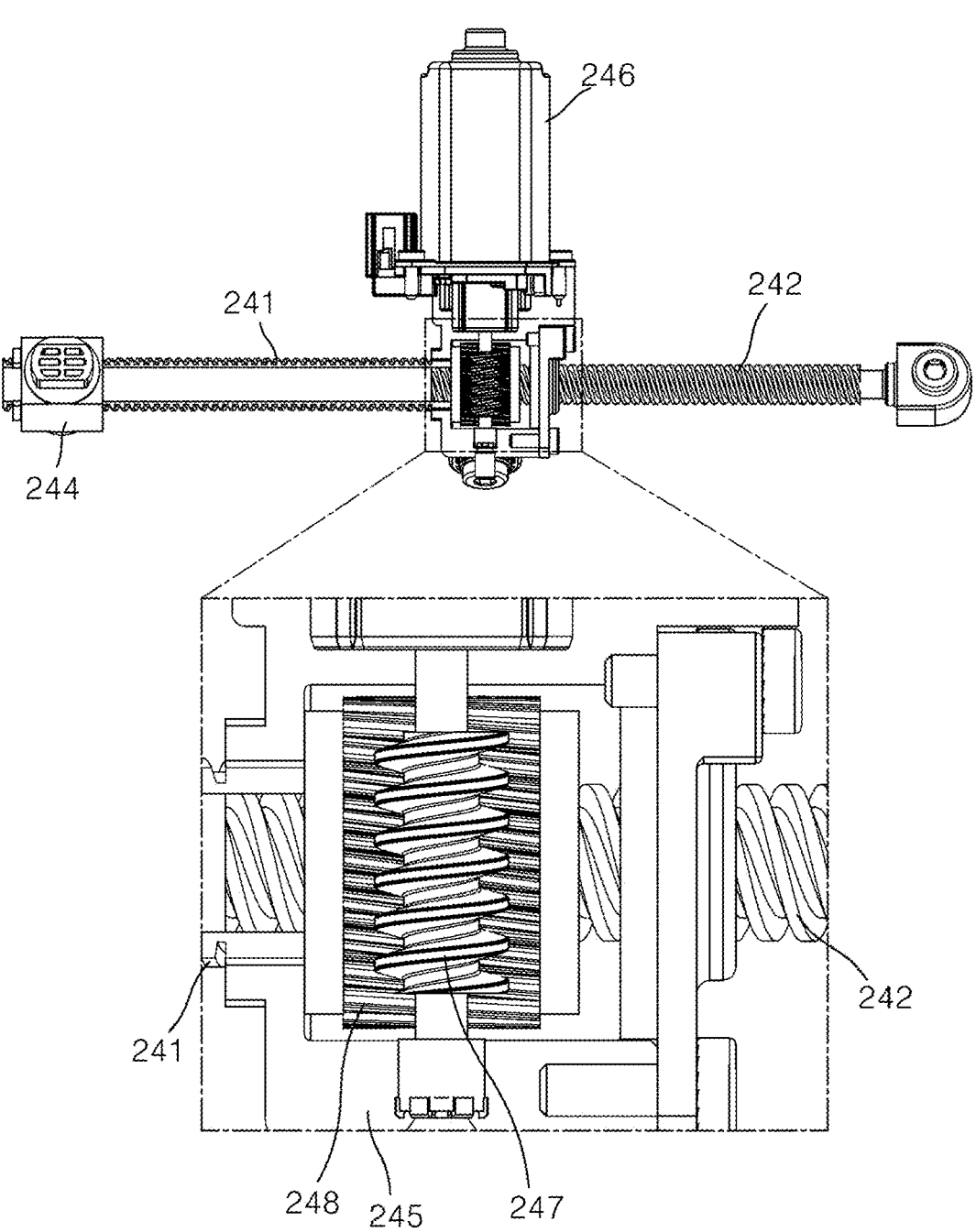
FIG. 6 is a view and partially enlarged view showing the operating state of the teledrive unit in the fully tele-out state of the stowable electric column according to the embodiment of the present disclosure.
Figure 7:
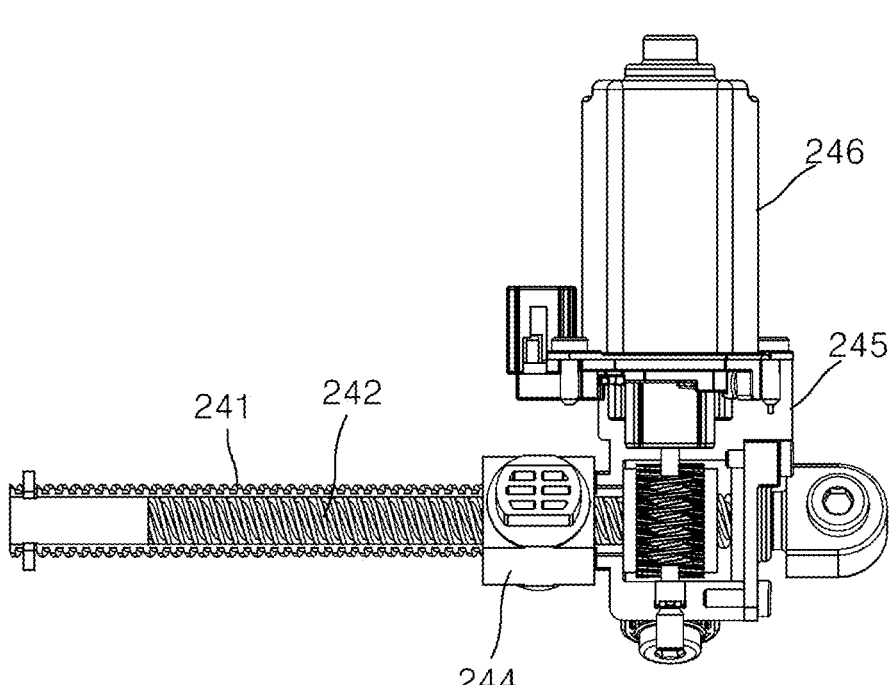
FIG. 7 is a view showing the operating state of the teledrive unit in the fully tele-in state of the stowable electric column according to the embodiment of the present disclosure.

FIG. 5 is an exploded perspective view of a teledrive unit in FIG. 2. FIG. 6 is a view and partially enlarged view showing the operating state of the teledrive unit in the fully tele-out state of the stowable electric column according to the embodiment of the present disclosure. FIG. 7 is a view showing the operating state of the teledrive unit in the fully tele-in state of the stowable electric column according to the embodiment of the present disclosure.

Referring to FIG. 2 and FIGS. 5 to 7, the second column portion 220 may be inserted into the inside of the first column portion 210 in the longitudinal direction or withdrawn from the inside of the first column portion 210 in the longitudinal direction. The third column portion 230 may be inserted into the inside of the second column portion 220 in the longitudinal direction or withdrawn from the inside of the second column portion 220 in the longitudinal direction.

The outer diameter of the third column portion 230 is formed smaller than that of the second column portion 220, allowing one end portion of the third column portion 230 to be disposed inside the second column portion 220.

An outer circumferential surface of the third column portion 230 may be supported by an inner circumferential surface of the second column portion 220. This allows the axial length of the stowable electric column 200 to be stably varied and may prevent noise generation during the adjustment of the telescopic range of the stowable electric column 200.

A ball plunger (not shown) may be mounted to protrude inward from the second column portion 220, and the third column portion 230 may have engaging holes (not shown) at the fully withdrawn position and the fully inserted position in the second column portion 220, where the ball plunger is engaged.

The teledrive unit 240 may include a first tele screw bar 241, a second tele screw bar 242, a tele bracket 243, a tele nut 244, a tele gearbox 245, and a tele motor 246.

The first tele screw bar 241 and the second tele screw bar 242 may be formed as straight bars with a circular cross-section, extending axially.

When the stowable electric column 200 is in the fully tele-out state as shown in FIGS. 1 to 3, the first tele screw bar 241, the second tele screw bar 242, and the tele nut 244 may be positioned as shown in FIG. 6. Such a position may be achieved by the unidirectional rotation of the first tele screw bar 241 driven by the driving force of the tele motor 246.

In addition, when the stowable electric column 200 is in the fully tele-in state as shown in FIG. 4, the first tele screw bar 241, the second tele screw bar 242, and the tele nut 244 may be positioned as shown in FIG. 7. Such a position may be achieved by the reverse rotation of the first tele screw bar 241 driven by the driving force of the tele motor 246.

Specifically, the first tele screw bar 241 may move in the longitudinal direction through a rotational motion, thereby moving the second column portion 220 and the third column portion 230 in the longitudinal direction.

The first tele screw bar 241 may be formed as a hollow cylindrical shape, and the second tele screw bar 242 may be inserted into the inside of the first tele screw bar 241 or withdrawn from the inside of the first tele screw bar 241.

Threads may be formed on outer and inner circumferential surfaces of the first tele screw bar 241, and threads may be formed on an outer circumferential surface of the second tele screw bar 242. The threads formed on the inner circumferential surface of the first tele screw bar 241 may engage with the threads formed on the outer circumferential surface of the second tele screw bar 242. Therefore, when the first tele screw bar 241 rotates by the driving force of the tele motor 246, the first tele screw bar 241 may move along the length of the second tele screw bar 242, allowing the second tele screw bar 242 to be inserted into the inside of the first tele screw bar 241 or withdrawn from the inside of the first tele screw bar 241.

That is, since the threads formed on the outer circumferential surface of the second tele screw bar 242 engage with the threads formed on the inner circumferential surface of the first tele screw bar 241, the first tele screw bar 241 moves in the direction longitudinal through a rotational motion, allowing the second tele screw bar 242 to be inserted into or withdrawn from the inside of the first tele screw bar 241.

The first tele screw bar 241 and the second tele screw bar 242 may be disposed to extend in the longitudinal direction of the stowable electric column 200. The second tele screw bar 242 may be mounted in the first column portion 210 so as not to move in the longitudinal direction, and the first tele screw bar 241 may move along the length of the second tele screw bar 242 during a rotational motion.

The first tele screw bar 241 and the second tele screw bar 242 may be disposed perpendicular to the rotation axis of the tele motor 246. The rotation axis of the tele motor 246 may be disposed parallel to the rotation axis of the tilt motor 252.

The tele bracket 243 may be movably mounted on the second column portion 220 in the longitudinal direction. That is, a tele guide hole 225 (see FIG. 3) may be formed to extend in the longitudinal direction in the second column portion 220, and the tele bracket 243 may pass through the tele guide hole 225 and be coupled to the third column portion 230. The tele bracket 243 may move in the longitudinal direction of the second column portion 220 along the tele guide hole 225.

The tele nut 244 may be mounted in the tele bracket 243. The first tele screw bar 241 may pass through the tele nut 244.

Threads may be formed on an inner circumferential surface of the tele nut 244. The threads formed on the inner circumferential surface of the tele nut 244 may engage with the threads formed on the outer circumferential surface of the first tele screw bar 241. Therefore, the tele nut 244 may move along the length of the first tele screw bar 241 together with the tele bracket 243 through the rotational motion of the first tele screw bar 241, thereby moving the third column portion 230 in the longitudinal direction.

The tele gearbox 245 may be mounted on the second column portion 220. The tele gearbox 245 may be secured to the second column portion 220 through a plurality of bolts. The tele gearbox 245 may have a rectangular tubular shape.

The tele gearbox 245 may have a plurality of gears 247 and 248 inside. Here, the plurality of gears 247 and 248 may rotate the first tele screw bar 241 through a rotational motion driven by the driving force of the tele motor 246.

The tele motor 246 may rotate the plurality of gears 247 and 248. The tele motor 246 may be secured to the tele gearbox 245 through a plurality of bolts.

The plurality of gears 247 and 248 may include a worm gear 247 and a worm wheel gear 248.

The worm gear 247 may be rotatably disposed inside the tele gearbox 245, and the worm wheel gear 248 may be rotatably disposed inside the tele gearbox 245 to engage with the worm gear 247.

The rotation axis of the tele motor 246 is coupled to the center of the worm gear 247, so the worm gear 247 may be rotated by the driving force of the tele motor 246, and the worm wheel gear 248 may be engaged with the worm gear 247 and rotated by the rotation of the worm gear 247.

One end portion of the first tele screw bar 241 may be disposed inside the tele gearbox 245 and coupled to the center of the worm wheel gear 248. The first tele screw bar 241 may pass through one side of the tele gearbox 245. On one side of the tele gearbox 245, a hole may be formed through which the first tele screw bar 241 passes.

One end portion of the second tele screw bar 242 may pass through the other side of the tele gearbox 245. On the other side of the tele gearbox 245, a hole may be formed through which the second tele screw bar 242 passes. The end portion of the second tele screw bar 242 may pass through a hole formed at the center of the worm wheel gear 248 and be inserted into the inside of the end portion of the first tele screw bar 241.

Accordingly, when the tele motor 246 is driven, the first tele screw bar 241 may be rotated by the worm gear 247 and the worm wheel gear 248 to move the tele nut 244 in the longitudinal direction, thereby moving the third column portion 230, connected to the tele nut 244 through the tele bracket 243, in the longitudinal direction. Simultaneously, the first tele screw bar 241 may move along the length of the second tele screw bar 242 together with the tele gearbox 245 and the tele motor 246, thereby moving the second column portion 220 in the longitudinal direction.

Meanwhile, the stowable electric column 200 may further include a tele support guider 270 (see FIG. 1) that supports the second column portion 220 and guides a longitudinal movement of the second column portion 220 when the second column portion 220 moves in the longitudinal direction.

The tele support guider 270 stably supports the second column portion 220 and enables a smooth longitudinal movement, thereby reducing the operating force required to vary the length of the column 200.

Below, a detailed description of the tele support guider 270 will be provided with reference to FIG. 8.

Figure 8:
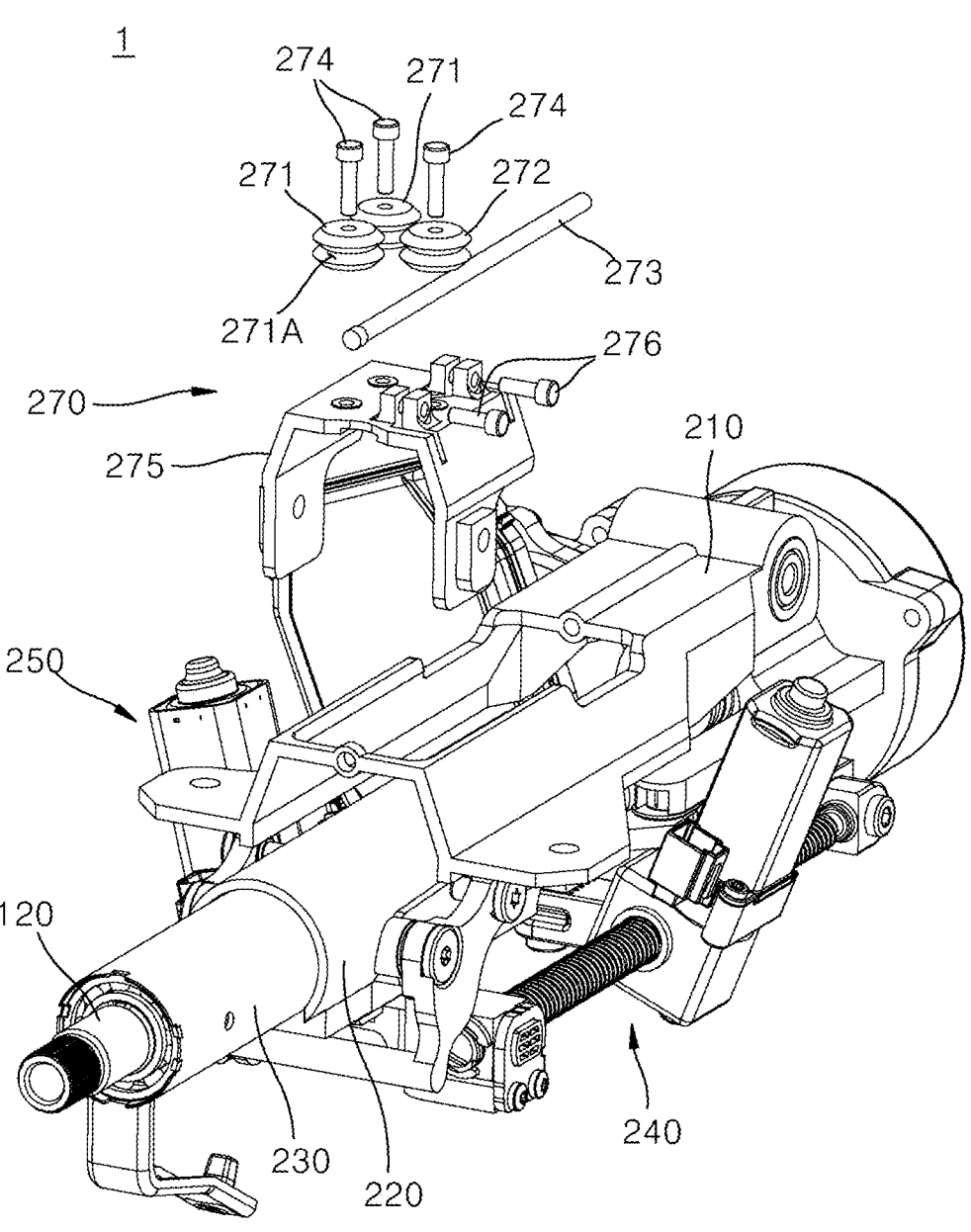
FIG. 8 is an exploded perspective view of a tele support guider in FIG. 1.

FIG. 8 is an exploded perspective view of a tele support guider in FIG. 1.

Referring to FIG. 8, the tele support guider 270 may include support rollers 271 and 272, a support guide bar 273, and a roller mounting bracket 275. However, the shape of the roller mounting bracket 275 may be integrally applied to the second column portion 220. In this case, the roller mounting bracket 275 may not be included in the tele support guider 270.

The support rollers 271 and 272 may be rotatably mounted on the roller mounting bracket 275. However, when the roller mounting bracket 275 is not provided, the support rollers 271 and 272 may be rotatably mounted on the second column portion 220.

The support guide bar 273 may be formed as a straight circular bar in the axial (longitudinal) direction. The support guide bar 273 may be mounted in the first column portion 210 to extend in the longitudinal direction. The first column portion 210 may have an open portion where the support guide bar 273 is mounted, thereby forming spaces on both sides of the support guide bar 273 for the support rollers 271 and 272 to roll.

A seating groove 271A may be formed on an outer circumferential surface of the support rollers 271 and 272. The support guide bar 273 may be seated in the seating groove 271A to support the support rollers 271 and 272 when the second column portion 220 moves in the longitudinal direction, and guide the rotation and longitudinal movement of the support rollers 271 and 272.

The seating groove 271A may be formed as a V-shaped groove. That is, when the support rollers 271 and 272 are cut in the rotational axis direction, the seating groove 271A may be V-shaped. The support rollers 271 and 272 may have both surfaces forming the seating groove 271A in contact with the support guide bar 273. Accordingly, when the second column portion 220 moves in the longitudinal direction, the support rollers 271 and 272 may smoothly move along the length of the support guide bar 273 and rotate.

The support rollers 271 and 272 may be provided as a plurality of support rollers 271 and 272. The plurality of support rollers 271 and 272 may include at least one first support roller 271 and at least one second support roller 272. One side of the support guide bar 273 may be inserted into the seating groove 271A of at least one first support roller 271. The other side of the support guide bar 273 may be inserted into the seating groove 271A of at least one second support roller 272. In the embodiment, at least one first support roller 271 is provided as a pair of first support rollers 271 spaced apart from each other in the axial direction, and at least one second support roller 272 is provided as a single second support roller 272.

The support rollers 271 and 272 may be rotatably mounted on the roller mounting bracket 275 using a coupling bolt 274.

The roller mounting bracket 275 may be coupled to the second column portion 220 and move in the longitudinal direction together with the second column portion 220 when the second column portion 220 moves in the longitudinal direction. The roller mounting bracket 275 may be coupled to the second column portion 220 using a coupling member, such as a bolt or may be welded to the second column portion 220.

The roller mounting bracket 275 may have a shape that partially surrounds the second column portion 220. That is, the roller mounting bracket 275 may be plate-shaped with an open lower side, which may surround the upper, left, and right portions of the outer periphery of the second column portion 220.

The roller mounting bracket 275 may be provided with an operating force adjustment bolt 276. The operating force adjustment bolt 276 may contact the support guide bar 273 and adjust the longitudinal operating force of the second column portion 220 through friction with the support guide bar 273.

A bolt mounting protrusion in which the operating force adjustment bolt 276 is installed may be formed on an upper surface of the roller mounting bracket 275. The operating force adjustment bolt 276 may pass through a hole formed in the bolt mounting protrusion, and the end surface thereof may contact the support guide bar 273.

The bolt mounting protrusion in which a single operating force adjustment bolt 276 is installed may be formed as a pair of bolt mounting protrusions spaced apart from each other in the longitudinal direction of the operating force adjustment bolt 276.

The operating force adjustment bolt 276 may be provided as a pair of operating force adjustment bolts 276 axially spaced apart from each other. The operating force adjustment bolt 276 may be provided as a plurality of operating force adjustment bolts 276 or at least one operating force adjustment bolt 276.

The operation of the stowable electric column 200 according to the embodiment of the present disclosure, configured as described above, is described as follows.

First, the adjustment of the stowable electric column 200 from the fully tele-out state, as shown in FIGS. 1 to 3, to the fully tele-in state, as shown in FIG. 4, is described as follows.

When the stowable electric column 200 is in the fully tele-out state, as shown in FIGS. 1 to 3, and the rotation axis of the tele motor 246 rotates in one direction, the worm gear 247 provided inside the tele gearbox 245 rotates in one direction together with the rotation axis of the tele motor 246, thereby rotating the worm wheel gear 248 provided inside the tele gearbox 245 in one direction.

Accordingly, when the worm wheel gear 248 provided inside the tele gearbox 245 rotates in one direction, the first tele screw bar 241 rotates in one direction together with the worm wheel gear 248 and moves the tele nut 244 closer to the tele gearbox 245. Simultaneously, the first tele screw bar 241 moves along the length of the second tele screw bar 242, allowing the second tele screw bar 242 to be inserted inside.

Accordingly, when the tele nut 244 moves closer to the tele gearbox 245, the tele bracket 243, being coupled to the tele nut 244, moves together with the tele nut 244 in the direction of movement of the tele nut 244. Accordingly, since the third column portion 230 is coupled to the tele bracket 243, the third column portion 230 moves together with the tele bracket 243 in the direction of movement of the tele nut 244 and is inserted into the second column portion 220. Simultaneously, since the first tele screw bar 241 moves along the length of the second tele screw bar 242, allowing the second tele screw bar 242 to be inserted inside, the tele gearbox 245, where the second tele screw bar 242 is mounted, moves in the direction of movement of the second tele screw bar 242. Accordingly, the second column portion 220, to which the tele gearbox 245 is coupled, moves in the direction of movement of the second tele screw bar 242 and is inserted into the first column portion 210. Accordingly, as the third column portion 230 is fully inserted into the second column portion 220 and the second column portion 220 is fully inserted into the first column portion 210, the stowable electric column 200 may be in the fully tele-in state, as shown in FIG. 4.

Second, the adjustment of the stowable electric column 200 from the fully tele-in state, as shown in FIG. 4, to the fully tele-out state, as shown in FIGS. 1 to 3, is described as follows.

The adjustment of the stowable electric column 200 from the fully tele-in state, as shown in FIG. 4, to the fully tele-out state, as shown in FIGS. 1 to 3, operates by reversing the rotation direction of the rotation axis of the tele motor 246 with respect to the adjustment of the stowable electric column 200 from the fully tele-out state, as shown in FIGS. 1 to 3, to the fully tele-in state, as shown in FIG. 4.

That is, when the stowable electric column 200 is in the fully tele-in state, as shown in FIG. 4, and the rotation axis of the tele motor 246 rotates in the opposite direction, the worm gear 247 provided inside the tele gearbox 245 rotates in the opposite direction together with the rotation axis of the tele motor 246, thereby rotating the worm wheel gear 248 provided inside the tele gearbox 245 in the opposite direction.

Accordingly, when the worm wheel gear 248 provided inside the tele gearbox 245 rotates in the opposite direction, the first tele screw bar 241 rotates in the opposite direction together with the worm wheel gear 248 and moves the tele nut 244 away from the tele gearbox 245. Simultaneously, the first tele screw bar 241 moves along the length of the second tele screw bar 242, allowing the second tele screw bar 242 to be withdrawn from inside.

Accordingly, as the tele nut 244 moves away from the tele gearbox 245, the tele bracket 243 moves together with the tele nut 244 in the direction of movement of the tele nut 244. Accordingly, the third column portion 230 moves together with the tele bracket 243 in the direction of movement of the tele nut 244 and is withdrawn from the inside of the second column portion 220. Simultaneously, since the first tele screw bar 241 moves along the length of the second tele screw bar 242, allowing the second tele screw bar 242 to be withdrawn from inside, the tele gearbox 245 moves in the direction of movement of the second tele screw bar 242. Accordingly, the second column portion 220 moves in the direction of movement of the second tele screw bar 242 and is withdrawn from the inside of the first column portion 210. Accordingly, as the third column portion 230 is fully withdrawn from the inside of the second column portion 220, and the second column portion 220 is fully withdrawn from the inside of the first column portion 210, the stowable electric column 200 may be in the fully tele-out state, as shown in FIGS. 1 to 3.

Meanwhile, when the stowable electric column 200 performs tele-out and tele-in operations, the support rollers 271 and 272 may rotate in close contact with the support guide bar 273 and move in the longitudinal direction together with the second column portion 220, allowing the second column portion 220 to move smoothly in the longitudinal direction.

As described above, the stowable electric column 200 according to the embodiment of the present disclosure includes the first column portion 210, the second column portion 220 which is slidably and coaxially disposed inside the first column portion 210 and is movable in the longitudinal direction through one end of the first column portion 210, the third column portion 230 which is coaxially disposed to be fastened to the inside of the second column portion 220 and is movable in the longitudinal direction through one end of the second column portion 220, and the teledrive unit 240 which moves the second column portion 220 and the third column portion 230 in the longitudinal direction, so that the length of the column 200 is configured to be as variable as possible, and thus, a maximum space in a cabin for the convenience and activities of a driver during autonomous driving of a vehicle may be secured.

In addition, the stowable electric column 200 according to the embodiment of the present disclosure includes the first tele screw bar 241 which moves in the longitudinal direction through a rotational motion and moves the second column portion 220 and the third column portion 230 in the longitudinal direction, and the second tele screw bar 242 mounted in the first column portion 210 and configured to have threads formed on the outer circumferential surface thereof, which engage with threads formed on the inner circumferential surface of the first tele screw bar 241, thereby being inserted into or withdrawn from the inside of the first tele screw bar 241 as the first tele screw bar 241 moves in the longitudinal direction through the rotational motion, so that the length of the column 200 is configured to be as variable as possible, and thus, a maximum space in a cabin for the convenience and activities of a driver during autonomous driving of a vehicle may be secured.

In addition, the stowable electric column 200 according to the embodiment of the present disclosure stably supports the second column portion 220 through the support rollers 271 and 272 and the support guide bar 273 and smoothly moves the second column portion 220 in the longitudinal direction during the length adjustment of the column 200, thereby reducing the operating force required for the length adjustment of the column 200.

A person having ordinary knowledge in the art to which the present disclosure pertains will understand that the present disclosure may be implemented in other detailed forms without changing the technical spirit or essential characteristics of the present disclosure. Accordingly, the aforementioned embodiments should be construed as being only illustrative, but should not be construed as being restrictive from all aspects. The scope of the present disclosure is defined by the appended claims rather than by the detailed description, and all changes or modifications derived from the meanings and scope of the claims and equivalent concepts thereof should be interpreted as being included in the scope of the present disclosure.

The present disclosure provides a stowable electric column configured to enable the length of the column to be as variable as possible, thereby securing a maximum space in a cabin for the convenience and activities of a driver during autonomous driving of a vehicle.

The invention claimed is:

1. A stowable electric column comprising:
a first column portion;
a second column portion slidably and coaxially disposed inside the first column portion and configured to be movable in a longitudinal direction through one end of the first column portion;
a third column portion coaxially disposed to be fastened to the inside of the second column portion and to be movable in a longitudinal direction through one end of the second column portion; and
a teledrive unit configured to move the second column portion and the third column portion in a longitudinal direction,
wherein the teledrive unit comprises:
a first tele screw bar configured to move in a longitudinal direction through a rotational motion and move the second column portion and the third column portion in a longitudinal direction; and
a second tele screw bar mounted on the first column portion and configured to have threads formed on an outer circumferential surface thereof, which engage with threads formed on an inner circumferential surface of the first tele screw bar, thereby being inserted into or withdrawn from inside the first tele screw bar as the first tele screw bar moves in a longitudinal direction through the rotational motion;
a tele bracket movably mounted on the second column portion in a longitudinal direction and coupled to the third column portion;
a tele nut mounted in the tele bracket, through which the first tele screw bar passes, and configured to move along a length of the first tele screw bar together with the tele bracket through the rotational motion of the first tele screw bar.

2. The stowable electric column of claim 1, wherein the teledrive unit further comprises:
a tele gearbox mounted on the second column portion and configured to include a plurality of gears inside, which rotate the first tele screw bar through a rotational motion; and
a tele motor configured to rotate the plurality of gears.

3. The stowable electric column of claim 2, wherein a tele guide hole is formed in the second column portion to extend in a longitudinal direction, and the tele bracket is movable in a longitudinal direction of the second column portion along the tele guide hole.

4. The stowable electric column of claim 2, wherein the plurality of gears comprises:
a worm gear rotatably disposed inside the tele gearbox; and
a worm wheel gear rotatably disposed inside the tele gearbox to engage with the worm gear,
wherein one end portion of the first tele screw bar is disposed inside the tele gearbox so that the worm wheel gear is engaged, and
one end portion of the second tele screw bar passes through the tele gearbox and the worm wheel gear, and is inserted into the end portion of the first tele screw bar.

5. A stowable electric column comprising:
a first column portion;
a second column portion slidably and coaxially disposed inside the first column portion and configured to be movable in a longitudinal direction through one end of the first column portion;

a third column portion coaxially disposed to be fastened to the inside of the second column portion and to be movable in a longitudinal direction through one end of the second column portion; and a teledrive unit configured to move the second column portion and the third column portion in a longitudinal direction;

a support roller rotatably mounted on the second column portion and configured to have a seating groove formed on an outer circumferential surface thereof; and a support guide bar mounted in the first column portion to extend in a longitudinal direction and seated in the seating groove, which supports the support roller during a longitudinal movement of the second column portion and guides a rotation and longitudinal movement of the support roller.

6. The stowable electric column of claim 5, wherein the seating groove is V-shaped.

7. The stowable electric column of claim 5, wherein the support roller is provided as a plurality of support rollers, and the plurality of support rollers comprise:

at least one first support roller, wherein one side of the support guide bar is inserted into a seating groove of the at least one first support roller; and at least one second support roller, wherein an opposite side of the support guide bar is inserted into a second seating groove of the at least one second support roller.

8. The stowable electric column of claim 5, further comprising:

a roller mounting bracket coupled to the second column portion, which moves in a longitudinal direction together with the second column portion during a longitudinal movement of the second column portion, and on which the support roller is rotatably mounted.

9. The stowable electric column of claim 8, further comprising:

an operating force adjustment bolt installed in the roller mounting bracket, which contacts the support guide bar and adjusts a longitudinal operating force of the second column portion.

* * * * *